(12) United States Patent
Kamiguchi

(10) Patent No.: US 11,943,194 B2
(45) Date of Patent: Mar. 26, 2024

(54) MESSAGE EXCHANGING DEVICE, AND MESSAGE EXCHANGING METHOD

(71) Applicant: FANUC CORPORATION, Yamanashi (JP)

(72) Inventor: Masao Kamiguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/801,040

(22) PCT Filed: Mar. 3, 2021

(86) PCT No.: PCT/JP2021/008110
§ 371 (c)(1),
(2) Date: Aug. 19, 2022

(87) PCT Pub. No.: WO2021/182219
PCT Pub. Date: Sep. 16, 2021

(65) Prior Publication Data
US 2023/0082124 A1    Mar. 16, 2023

(30) Foreign Application Priority Data
Mar. 10, 2020 (JP) ................................. 2020-041277

(51) Int. Cl.
*H04L 51/52*     (2022.01)
*H04L 51/216*    (2022.01)

(52) U.S. Cl.
CPC ............ *H04L 51/52* (2022.05); *H04L 51/216* (2022.05)

(58) Field of Classification Search
CPC ....... H04L 51/52; H04L 51/216; H04L 51/56; H04L 51/063; G06Q 50/01
See application file for complete search history.

(56) References Cited

U.S. PATENT DOCUMENTS

| 2009/0162824 | A1  | 6/2009 | Heck |
| 2013/0097260 | A1* | 4/2013 | Lee .......................... H04W 4/00 709/206 |

(Continued)

FOREIGN PATENT DOCUMENTS

| JP | 2002-49296 | 2/2002 |
| JP | 2009-187044 | 8/2009 |

(Continued)

OTHER PUBLICATIONS

International Search Report dated Apr. 27, 2021 in corresponding International Application No. PCT/JP2021/008110.

*Primary Examiner* — Jungwon Chang
(74) *Attorney, Agent, or Firm* — Wenderoth, Lind & Ponack, L.L.P.

(57) ABSTRACT

Provided are a message exchanging device and a message exchanging method capable of comprehensively collecting and classifying related items for all messages (content) in a community employing a social networking service (SNS). This message exchanging device for exchanging messages between members belonging to an arbitrarily defined group, using an SNS group function, is provided with: a storage unit for storing the messages exchanged between the members; an item setting unit for setting items for classifying the messages exchanged between the members belonging to the group; a message exchanging unit for exchanging the message separately for each item set by the item setting unit; and an item-specific message management unit for storing, separately for each item, the messages exchanged by the message exchanging unit in the storage unit.

8 Claims, 10 Drawing Sheets

(56) References Cited

U.S. PATENT DOCUMENTS

| | | | | |
|---|---|---|---|---|
| 2013/0179800 A1* | 7/2013 | Jeong | .................... | H04L 51/216 |
| | | | | 715/752 |
| 2015/0088981 A1 | 3/2015 | Brousseau et al. | | |
| 2016/0014151 A1* | 1/2016 | Prakash | .................. | H04L 47/62 |
| | | | | 726/22 |
| 2018/0048604 A1* | 2/2018 | Mikhailov | .............. | H04W 4/23 |
| 2019/0129958 A1* | 5/2019 | Liao | .................... | G06F 16/3326 |
| 2019/0207897 A1* | 7/2019 | Arastafar | ................. | H04L 51/56 |
| 2019/0317928 A1* | 10/2019 | Hirata | ................... | H04L 51/063 |
| 2021/0064692 A1* | 3/2021 | Srinivasan | .............. | G06F 40/56 |

FOREIGN PATENT DOCUMENTS

| | | |
|---|---|---|
| JP | 2017-73062 | 4/2017 |
| JP | 6550628 B1 | 7/2019 |
| JP | 2020-30713 | 2/2020 |

* cited by examiner

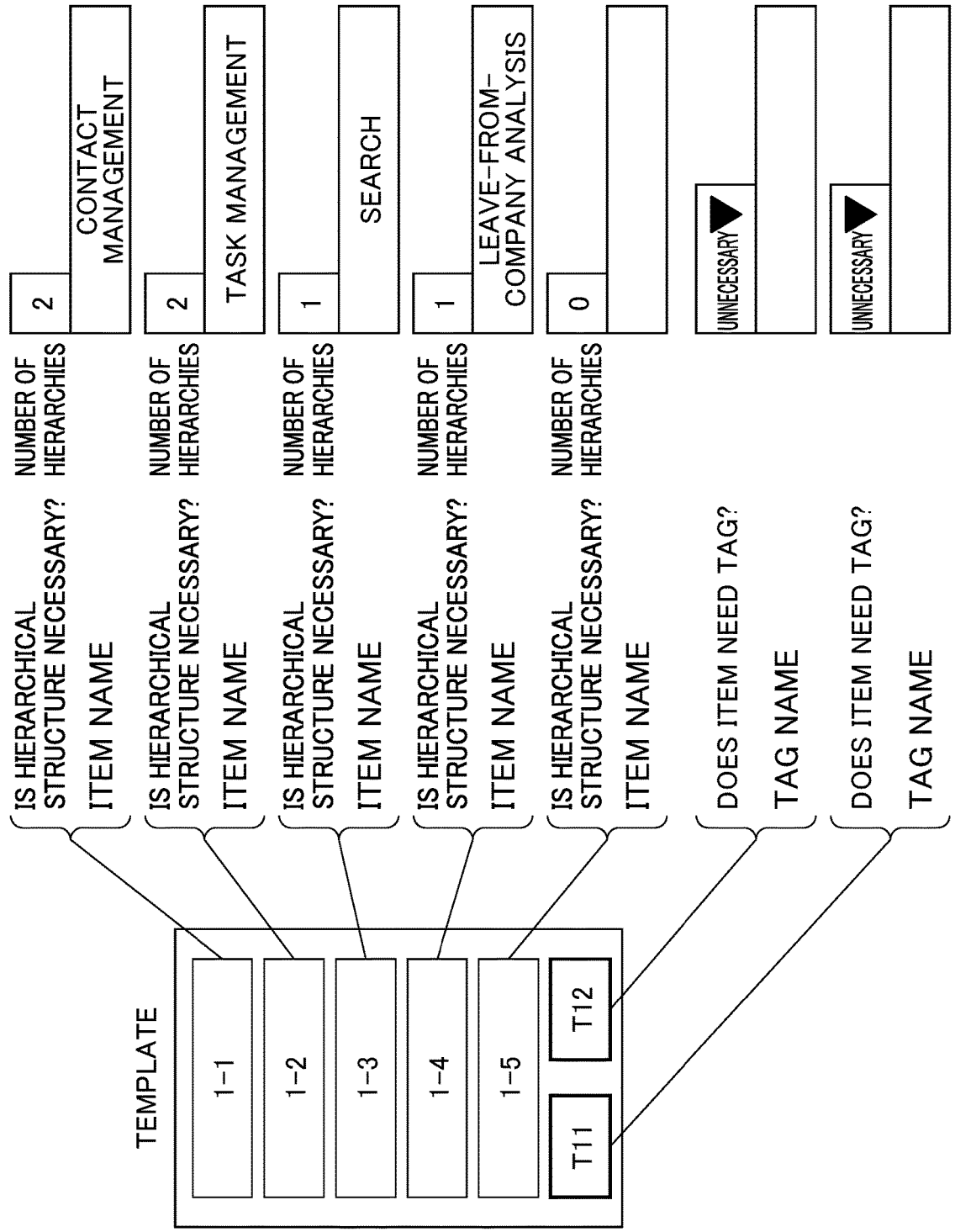

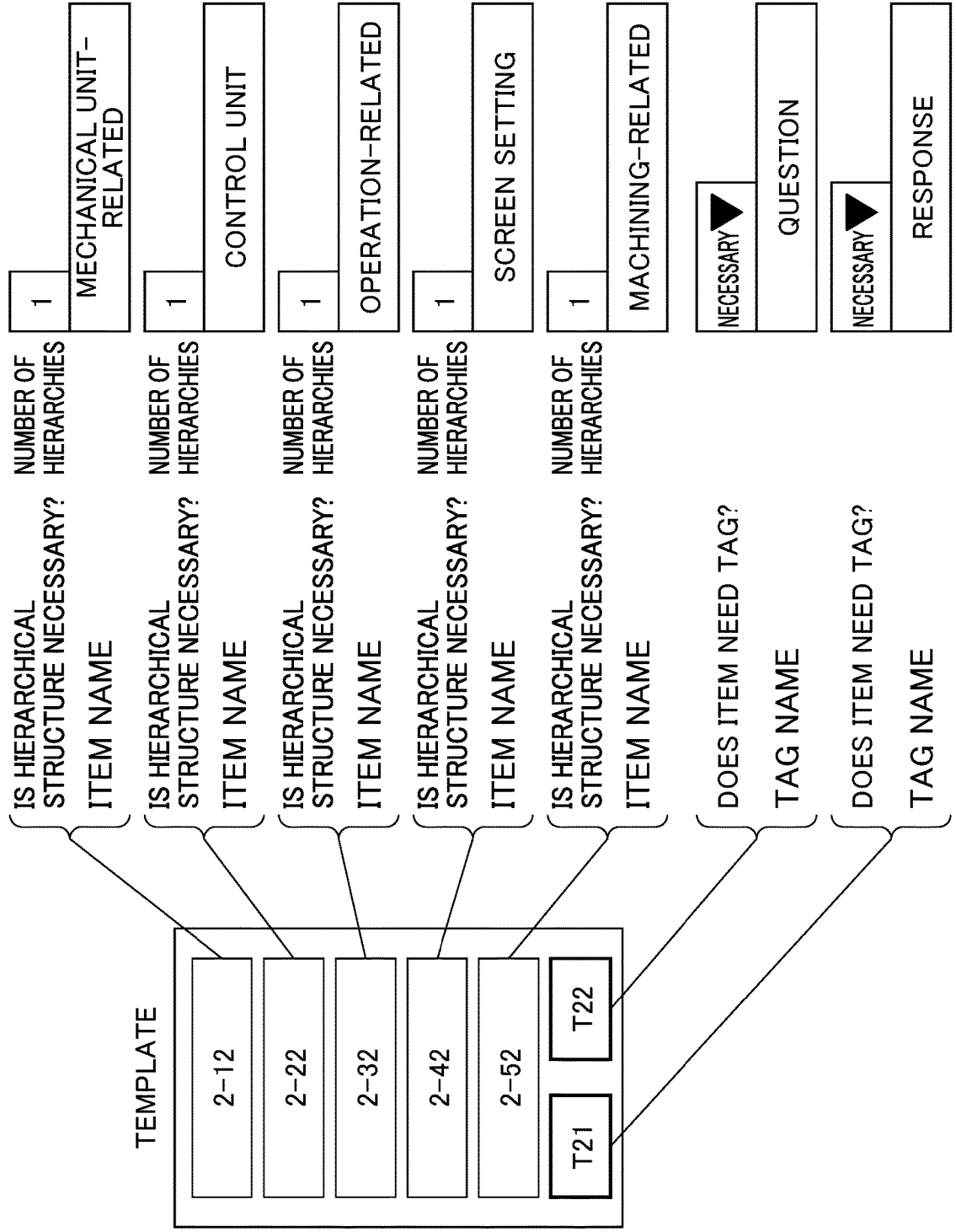

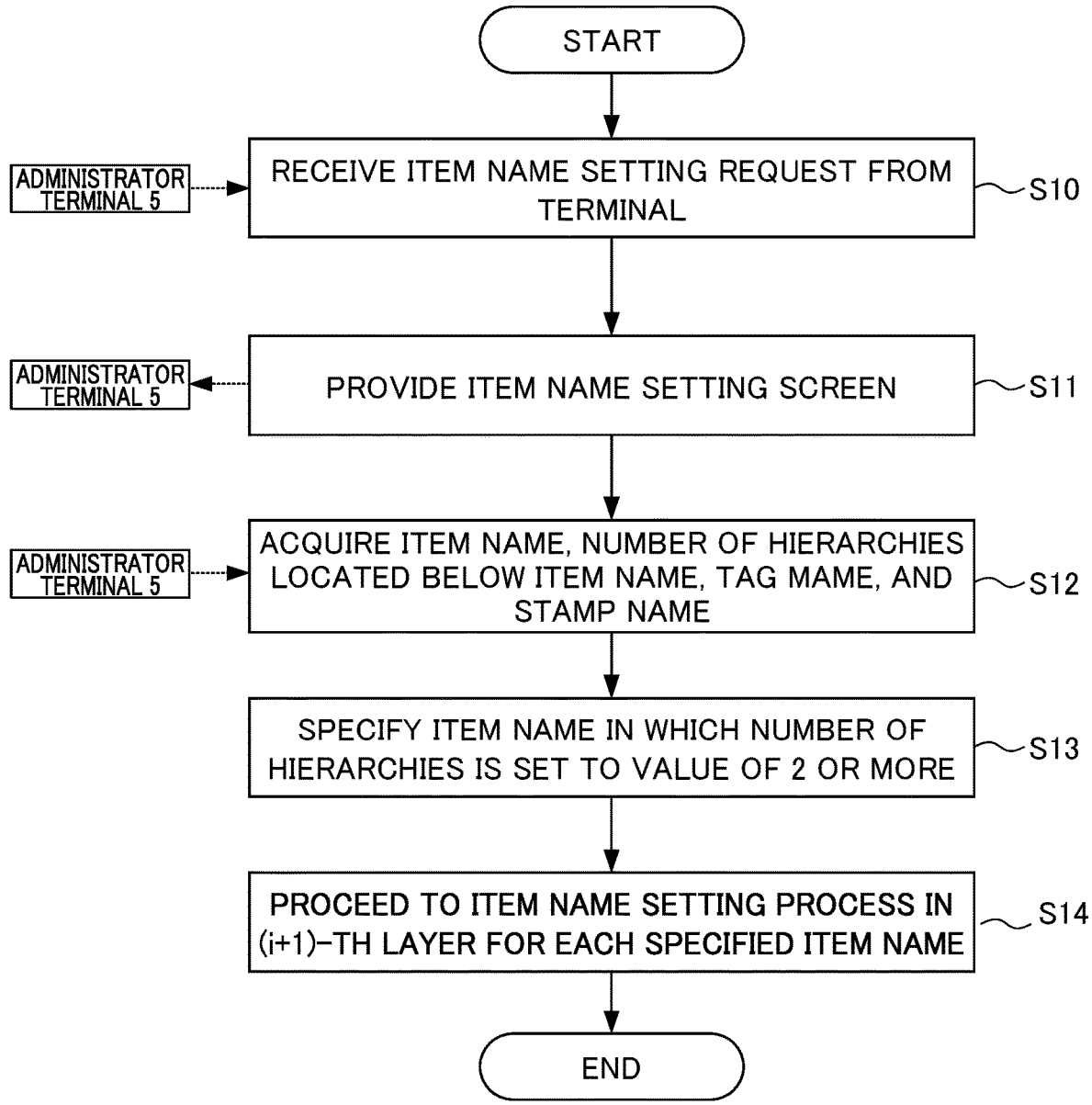

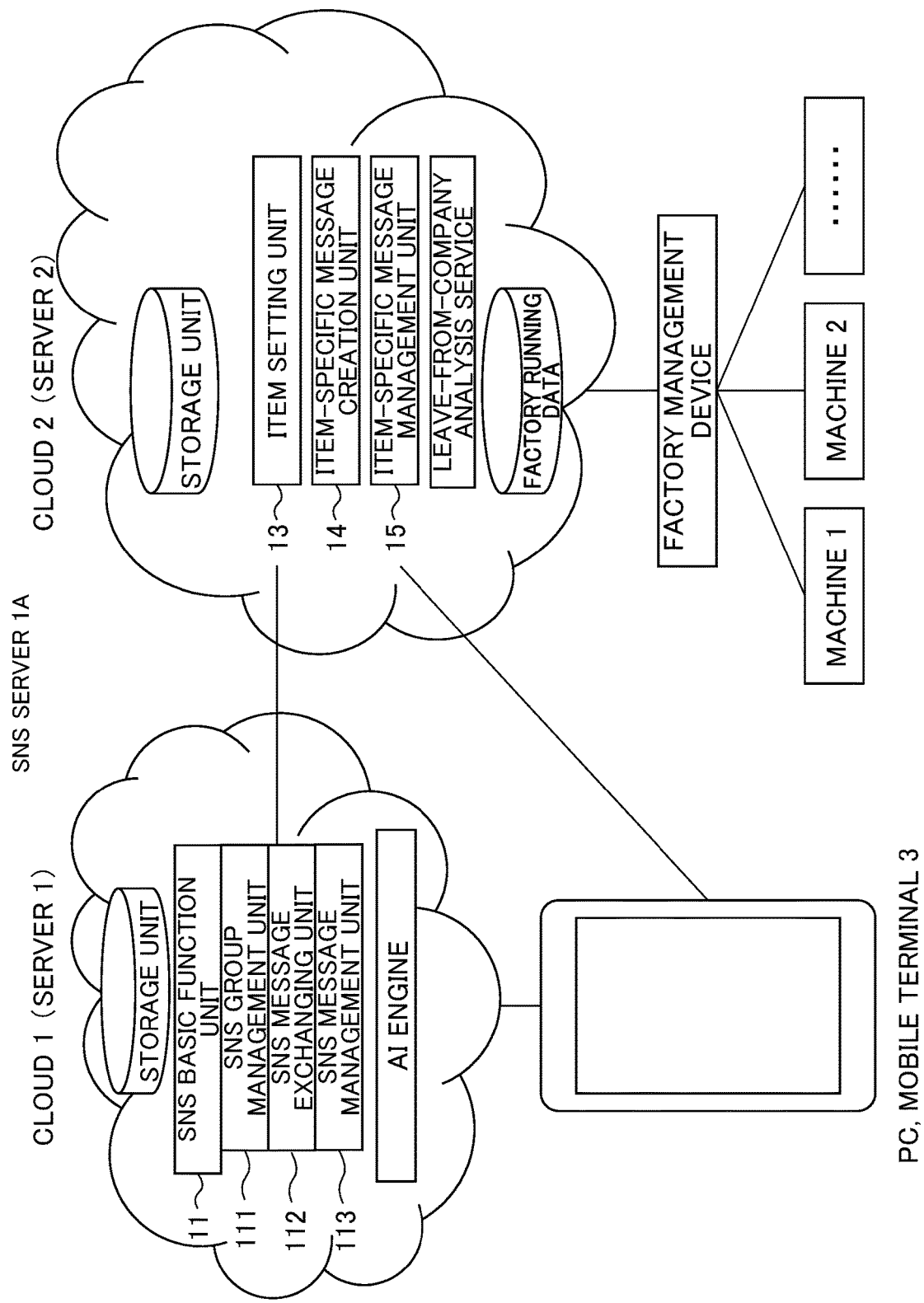

MESSAGE EXCHANGING DEVICE, AND MESSAGE EXCHANGING METHOD

TECHNICAL FIELD

The present invention relates to a message exchanging device and a message exchanging method.

BACKGROUND ART

Conventionally, there is a so-called SNS (social networking service) that provides means and places for facilitating communication between friends and acquaintances. Compared to simple posting on an Internet bulletin board, the SNS has continuity in communication between users, and can communicate with many people with various contents. In addition, users participate in a virtual space (exchange area) called a community set for each theme (or genre) by the users or an administrator in advance, and the users can freely communicate with each other according to the theme (or genre) in the community. Since various contents are exchanged in such a community, a technique such as keyword assignment using a hashtag has been developed as a method of collecting necessary contents, for example. By using such a method, it is possible to assign an arbitrary keyword (or classification) to a message (hereinafter, the message itself is also referred to as "content" unless otherwise specified) sent by a user. Thus, it is possible to search for and collect the messages (content) assigned with the hashtag, based on the keyword (classification) assigned based on the hashtag. However, in a case of using the keyword (classification) assigned based on the hashtag, even between members of a specific group, it is difficult to define an arbitrarily unified keyword assignment method among a plurality of users, and although related items can be stochastically collected from big data accumulated in the community, it is difficult to comprehensively collect and classify all related items. In this regard, Japanese Unexamined Patent Application, Publication No. 2017-073062 discloses a posting system 1 that uses an SNS to receive cyber threat intelligence information posted from a user terminal 10A and registers the posted cyber threat intelligence information in a cyber threat intelligence DB 21. In the posting system disclosed in Japanese Unexamined Patent Application, Publication No. 2017-073062, a poster posts information based on a data structure (for example, STIX language) for describing cyberattack activity-related items that incorporate events characterizing a cyberattack. Thus, a cyber threat intelligence management system 3 performs syntactic analysis on cyber threat intelligence 21A stored in the cyber threat intelligence DB 21, and acquires information on various types of attackers, attack methods, detection indicators, observed phenomena, incidents, countermeasures, attack targets, and the like along with the cyberattack activity. Next, the cyber threat intelligence management system 3 can perform analysis such as counting of the acquired information related to the cyberattack, generate an information source management DB 31 of the analysis result, and display it on a user terminal 30.
Patent Document 1: Japanese Unexamined Patent Application, Publication No. 2017-073062

DISCLOSURE OF THE INVENTION

Problems to be Solved by the Invention

According to the posting system disclosed in Japanese Unexamined Patent. Application, Publication No. 2017-073062, from all cyber threat intelligence information which are the contents collected using the SNS, the information related to the related items (for example, various types of attackers, attack methods, detection indicators, observed phenomena, incidents, countermeasures, and attack targets) can be comprehensively collected and classified. However, in the posting system disclosed in Japanese Unexamined Patent Application, Publication No. 2017-073062, the poster needs to describe the message to be posted, based on a predetermined data structure such as the STIX language. For this reason, the posting system disclosed in Japanese Unexamined Patent Application, Publication No. 2017-073062 does not realize that the messages (contents) to be posted via an interface provided in the SNS are comprehensively collected and classified based on the related item. (for example, various types of attackers, attack methods, detection indicators, observed phenomena, incidents, countermeasures, and attack targets). In this way, even when the members belonging to the community using the SNS are members of a specific group, it is difficult to define that all the members add a unified classification to the messages, and it is difficult to comprehensively classify the related items with respect to all the messages. For this reason, when messages (contents) are exchanged in any community that uses an SNS, it is desirable to provide an SNS in which classification items commonly used for messages (contents) sent by all the users belonging to the community can be arbitrarily set in advance and all the messages (contents) can be sent according to the set classification items.

An object of the present invention is to provide a message exchanging device and a message exchanging method in which when messages (contents) are exchanged in any community that uses an SNS, classification items commonly used for messages (contents) sent by all the users belonging to the community can be arbitrarily set in advance and all the messages (contents) can be sent according to the set classification items.

Means for Solving the Problems (1) An aspect of the present invention provides a message exchanging device that exchanges messages between members belonging to any group, using an SNS group function, the message exchanging device including: a storage unit that stores the messages exchanged between the members; an item setting unit that sets items for classifying the messages exchanged between the members belonging to the group; a message exchanging unit that exchanges a message for each of the items set by the item setting unit; and an item-specific message management unit that stores, for each of the items, the message exchanged for each of the items in the storage unit.

(2) An aspect of the present invention provides a message exchanging method of exchanging messages between members belonging to any group, using an SNS group function, the message exchanging method being executed by a computer including a storage unit that stores the messages exchanged between the members and including: an item setting step of setting items for classifying the messages exchanged between the members belonging to the group; a message exchange step of exchanging a message for each of the items set in the item setting step; and an item-specific message management step of storing, for each of the items, the message exchanged for each of the items in the storage unit.

Effects of the Invention

According to the present invention, it is possible to provide a message exchanging device and a message exchanging method in which when messages (contents) are exchanged in a community that uses an SNS, classification items commonly used for messages (contents) sent by all the users belonging to the community can be set in advance and all the messages (contents) can be sent according to the set classification items.

BRIEF DESCRIPTION OF THE DRAWINGS

FIG. 3A is a diagram showing an example of an item setting screen for setting a first hierarchical item for classifying messages to be exchanged by taking, as an example, a community including an operator of an industrial machine and a maintenance group of the industrial machine;

FIG. 3B is a diagram showing an example of an item setting screen for setting a second hierarchical item for classifying messages to be exchanged by taking, as an example, a community including an operator of an industrial machine and a maintenance group of the industrial machine;

FIG. 8 is a flowchart showing an item setting process in the message exchanging device; and FIG. 9 is an overall diagram showing an example of an SNS system capable of cooperating with an edge server that acquires status data of an industrial machine running in a factory during message exchange.

PREFERRED MODE FOR CARRYING OUT THE INVENTION

Embodiments of the present invention will be described below with reference to the drawings. It should be noted that these embodiments are merely examples, and the technical scope of the present invention is not limited to the embodiments.

First Embodiment

Figure 1:
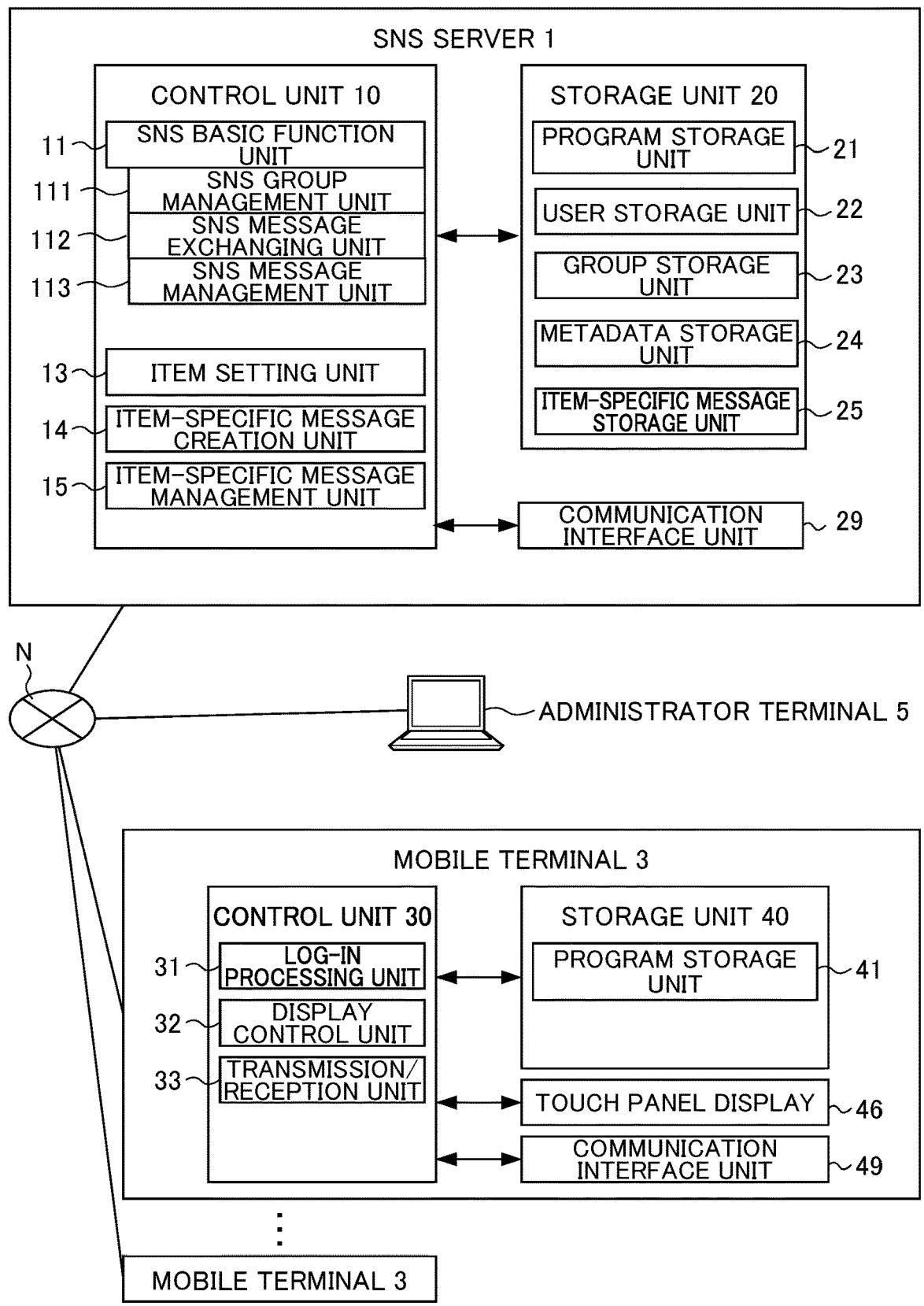
FIG. 1 is a diagram showing an overall constitution and a functional block of an SNS system.

<Overall Constitution of SNS System 100>
FIG. 1 is a diagram showing an overall constitution and functional blocks of an SNS system 100 according to a first embodiment.

As shown in FIG. 1, the SNS system 100 is a system that performs processing related to SNS, and in particular, is configured such that a classification item can be arbitrary set in advance that is commonly used for messages (contents) to be sent by all users belonging to a preset community. Thus, the SNS system 100 can be used as a communication system capable of sending all messages (contents) according to the classification item arbitrarily set in advance. Further, items related to all messages (contents) collected in the community can be comprehensively collected and classified. As will be described below, the SNS system 100 can be used, for example, among a user who performs a machining process on a workpiece, for example, using an industrial machine running in a factory, a member of the industrial machine tool builder who supports the machining process of the user, maintenance personnel of the industrial machine, and a call center. As shown in FIG. 1, the SNS system 100 includes an SNS server 1 as a message exchanging device, a plurality of mobile terminals 3 (terminals), and an administrator terminal 5. The SNS server 1, the mobile terminals 3, and the administrator terminal 5 can be communicate with each other via a communication network N. The communication network N is, for example, the Internet or a mobile phone communication network. Further, the communication network N may be, for example, a local area network (LAN) or a wide area network (WAN) including a wired line. Hereinafter, a description will be given as an example with respect to an exchange operation of the SNS system 100 in which a message is mainly exchanged among the user who performs the machining process on the workpiece, for example, using the industrial machine running in the factory, the member of the industrial machine-tool builder who supports the machining process of the user, the maintenance personnel of the industrial machine, and a receptionist of the call center, as described above. A user, who uses the SNS system, is not limited to the user described above. In any community set in the SNS system 100, the classification item can be arbitrary set in advance that is commonly used for messages (contents) to be sent by all users belonging to the community, and all messages (contents) can be sent according to the classification item set in advance.

<SNS Server 1>

The SNS server 1 is a message exchanging device configured to perform communication processing between the plurality of mobile terminals 3. In an open SNS environment, a virtual SNS space dedicated to a virtual community can be created. Here, the communication processing means, for example, message exchanging, posting, browsing, and calling along a timeline, and means information delivery that intentions, feelings, thoughts and the like are delivered between users via characters, voice, images, and the like. In this way, the messages include contents posted by the user within the group (virtual community). The SNS server 1 may be constituted by one computer, or may be constituted as a distributed processing system by a plurality of computers as will be described below. Specifically, for example, a message exchanged within a specific community set in advance, which will be described below, may be managed by a server managed by a host of the community or the like. Thus, the message exchanged within the specific community can physically ensure information security. When a plurality of computers are used, these computers are connected via the communication network N. Further, the SNS server 1 may be constituted as a virtual server (virtual machine) provided on a cloud, for example.

The SNS server 1 includes a control unit 10, a storage unit 20, and a communication interface unit 29. The control unit 10 is a central processing unit (CPU) that controls the entire SNS server 1. The control unit 10 appropriately reads and executes an operating system (OS) and an application program stored in the storage unit 20 to cooperate with the above-described hardware and execute various functions.

Specifically, an example will be described in the present embodiment in which the SNS server 1 is realized by causing the computer to execute the program. The program can be recorded in a computer-readable non-transitory information recording medium such as a compact disk, a flexible disk, a hard disk, a magneto-optical disk, a digital video disk, a magnetic tape, a ROM (Read Only Memory), an EEPROM (Electrically Erasable Programmable ROM), a flash memory, or a semiconductor memory. Such an information recording medium can be distributed and sold independently of the computer.

Generally, the computer reads the program recorded in the non-transitory information recording medium into a RAM (Random Access Memory), which is a temporary storage device included in the storage unit 20, and then executes a command included in the program read by the CPU serving as the control unit 10. The program can be distributed and sold from a program distribution server or the like (not shown) to a computer or the like via a temporary transmission medium such as a communication network N, independently of the computer on which the program is executed.

Further, the program can also be described by a programming language for operation level description of an electronic circuit. In this case, various design drawings such as wiring diagrams or timing charts of electronic circuits are Generated from the program described by the programming language for operation level description of the electronic circuit, and an electronic circuit constituting the SNS server 1 can be created based on the design drawings. For example, from the program described by the programming language for operation level description of the electronic circuit, the SNS server 1 can be constituted on hardware that can be reprogrammed by FPGA (Field Programmable Gate Array) technology, and an electronic circuit dedicated to specific use can also be constituted by ASIC (Application Specific Integrated Circuit) technology.

The details of the control unit 10 will be described below, and first, the storage unit 20 will be briefly described. The storage unit 20 is a storage zone for a hard disk, a semiconductor memory element, or the like for storing programs, data, and the like necessary for the control unit 10 to execute various kinds of processing. The storage unit 20 includes a program storage unit 21, a user storage unit 22, a group storage unit 23, a metadata storage unit 24, and an item-specific message storage unit 25. The program storage unit 21 is a storage zone that stores various programs. The program storage unit 21 stores a user management program. The user management program is a program for executing each function of the control unit 10 to be described below.

The user storage unit 22 is a storage zone that stores data related to the user in association with the group. The user storage unit 22 stores, for example, a user ID, a user name, and a group ID for identifying the group, in association with each other.

The group storage unit 23 is a storage zone that stores data related to the group. The group storage unit 23 stores, for example, a group ID and a group name ("item name" to be described below) in association with each other. Further, as will be described below, since the group ("item name" to be described below) can be set in a hierarchical structure, the group storage unit 23 may store a hierarchical relationship between the groups. In other words, members belonging to a high-ranking group belong to a low-ranking group in the high-ranking group. On the contrary, members only belonging to the low-ranking group may not belong to a high-ranking group or the like in the low-ranking group. For this reason, the group storage unit 23 may, for example, store a high-ranking group ID, which is a high rank closest to the group ID, in association with each other.

The metadata storage unit 24 stores an item data dictionary that stores metadata for each item name with respect to item names, tags, and stamps set by the item setting unit 13 to be described below. The item names have a hierarchical structure, and each of the item names may be stored in association with an item name which is a high rank closest to the corresponding item name, for example. The item data dictionary may include the item ID by setting of an item ID corresponding to the item name.

The item-specific message storage unit 25 stores all messages exchanged within a specific group (community) corresponding to each of the item names set by the item setting unit 13 to be described below, tags attached to the messages, and stamps for evaluating the messages, in association with each other. Further, the item-specific message storage unit 25 stores a set of item-specific messages for each item name.

The communication interface unit 29 is an interface used to perform communication between the SNS server 1, the mobile terminal 3, and the administrator terminal 5. Next, the control unit 10 will be described.

The SNS server 1 is constituted such that the control unit 10 controls respective components shown below to execute respective processing described in the present embodiment. The control unit 10 includes an SNS basic function unit 11, an item setting unit 13, an item-specific message creation unit 14, and an item-specific message management unit 15.

The SNS basic function unit 11 includes an SNS group management unit 111, an SNS message exchanging unit 112, and a SNS message management unit 113.

<SNS Group Management Unit 111>

The SNS group management unit 111 sets and manages, for example, a group (also referred to as "community") including users who are interested in a common theme among SNS users and users who belong to a specific organization or the like. Specifically, for example, the SNS group management unit 111 may give a member management authority regarding addition or deletion of members to a user who is a group administrator (also referred to as "host"). Thus, the administrator can set and manage users belonging to the group (community) that is hosted by himself/herself. For example, the administrator transmits setting information regarding the group (community) from the administrator terminal 5 to the SNS group management unit 111, and the SNS group management unit 111 may store data regarding the user who participates in the group (community) by associating the group (community) with the user ID stored in the user storage unit 22 in the storage unit 20. In this way, the SNS group management unit 111 stores the data regarding the user, who participates in each group (community), in the user storage unit 22 in association with the group (community). Thus, when the user belonging to the group logs in to the SNS service, a message can be exchanged within the group (community) in which the user participates, for example. For example, the user may specify a group (community) at the time of log-in. Further, when the user logs in to the SNS service, the user may select the group (community) in which the message is exchanged by outputting a list of groups (communities) in which the user participates. In SNS, a user belonging to a group (community) may sometimes transmit information (invitation information) to invite, for example, an acquaintance who is an SNS user to the group (community). At this time, the SNS user receiving the invitation may be able to participate in the group (community) by accepting the invitation. In such a case, in a specific group (community) set in advance, the administrator of the group (community) may add a function of executing check processing. Thus, the administrator serving as the host of the community can decide whether to allow/disallow the invited SNS user to join the group (community). In other words, when a person belonging to a specific community invites a user who does not belong to the community, the administrator determines whether to add the invited user to the community. For example, as will be described below, in the group (community) set among the user who performs the machining process on the workpiece, for example, using the industrial machine running in the factory, the member of the industrial machine-tool builder who supports the machining process of the user, the maintenance personnel of the industrial machine, and the call center, the administrator decides whether to allow/disallow a user invited by the user belonging to the group to join. Thereby, it is possible to prevent a leakage of confidential information in the group (community) to a third party. Further, even when the administrator serving as the host overlooks the registration of useful user in the group, the members of the group can invite the useful users to add the overlooked useful users to the group.

<SNS Message Exchanging Unit 112>

The SNS message exchanging unit 112 manages (exchanges) transmission/reception of the message such that the message created by the user belonging to the group (community) can be browsed in the group (community). Specifically, the SNS message exchanging unit 112 provides the mobile terminal 3 of the user with a user interface corresponding to the group (community), thereby controlling input/output of the message exchanged within the group (community) to and from the mobile terminal 3 of the user. As will be described below, the SNS message exchanging unit 112 may exchange a message added with a tag set for each set setting item with respect to a message in a specific group (community) in which an item name or the like is set in advance by an administrator, and also exchange, as a message, a stamp set for each set setting item. More specifically, during message exchange within a specific group (community), the control unit 10 includes a function unit ("item-specific message creation unit 14" to be described below) that executes a function of adding the tag set for each setting item to the message and a function of using the stamp set for each setting item as a message, and the SNS message exchanging unit 112 may realize the above functions by cooperating with the function unit ("item-specific message creation unit 14"). Details of the function unit ("item-specific message creation unit 14") will be described below.

<SNS Message Management Unit 113>

The SNS message management unit 113 manages the message exchanged within the group (community) in association with the group (community). Specifically, the SNS message management unit 113 may store the message in an item-specific message storage zone, which is associated with the group (community), within the item-specific message storage unit 25. Further, the SNS message management unit 113 may store the message exchanged within the preset specific group (community) by associating the tag set in advance in the storage zone provided for each specific group (community) with the message. Further, the SNS message management unit 113 may store the stamp exchanged within the preset specific group (community) in association with the target message of the stamp. More specifically, during message exchange within a specific group (community), the control unit 10 includes a function unit ("item-specific message management unit 15" to be described below) that executes a function of storing and managing the tag set for each setting item in association with the message and a function of storing and managing the stamp set for each setting item in association with a target message of the stamp, and the SNS message management unit 113 may realize the above functions by cooperating with the function unit ("item-specific message management unit 15"). Details of the function unit ("item-specific message management unit 15") will be described below. The basic functions of the SNS basic function unit 11 have been described above. Next, function units other than the SNS basic function unit 11 will be described.

<Item Setting Unit 13>

When any member belonging to the group (community) sends, based on the designation from the administrator who manages the group (community), a message within the group (community) with respect to all messages exchanged within the group (community), the item setting unit 13 sets a common item name for the group (community) in advance such that the message is sent according to the common item name for the group (community). Specifically, the SNS group management unit 111 grants a common item setting authority for setting the common item name for the group (community) to the administrator who manages the group (community). For example, when the administrator newly hosts a group (community), the SNS group management unit 111 may grant the common item setting authority in addition to the member management authority in the group (community). Thus, the item setting unit 13 can set the common item name for the group (community) based on an instruction from the administrator having the common item setting authority. The item setting unit 13 can manage the item name set corresponding to the group (community) by storing the item data dictionary associated with the group (community) in the metadata storage unit 24 of the storage unit 20 which will be described below.

<Item Name>

Figure 2:
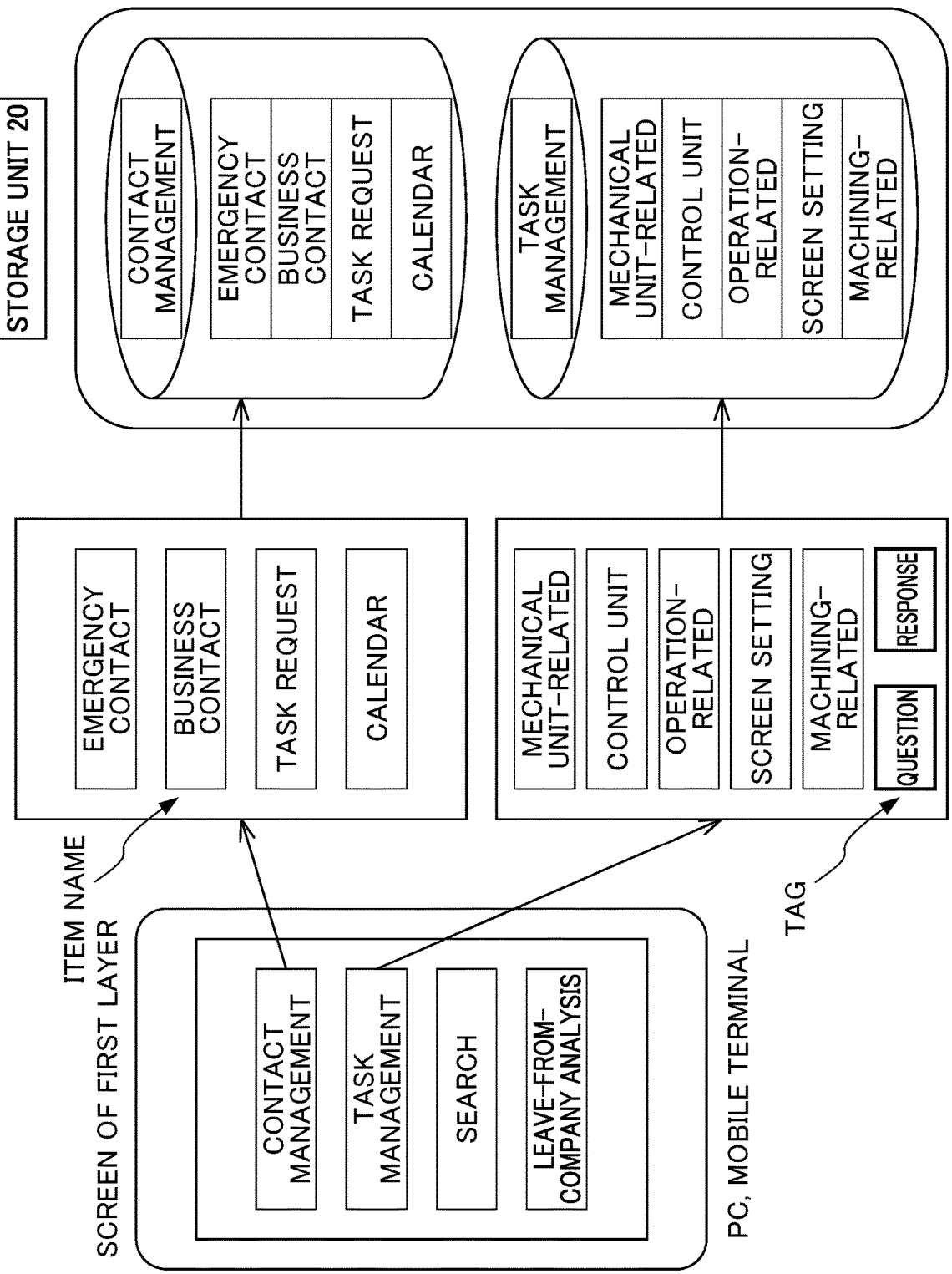
FIG. 2 is a diagram showing an example of an item that is set hierarchically by taking, as an example, a community including an operator of an industrial machine and a maintenance group of the industrial machine.

The item name will be described with reference to an example before details of the item setting unit 13 are described FIG. 2 is a diagram showing an example of the item name that is set hierarchically by taking, as an example, a community including, for example, a user who performs a machining process on a workpiece, for example, using the industrial machine running in the factory, a member of the industrial machine-tool builder who supports the machining process of the user, maintenance personnel of the industrial machine, and a receptionist of the call center. In the following example, an example is described in which the item name is set in a text format, but the present invention is not limited thereto. The item name may be set in any format, for example, a figure, a picture, or a pictogram other than text. As shown in FIG. 2, items can be set hierarchically for the preset group. With reference to FIG. 2, the items are set hierarchically as follows. For example, four items, that is, "Contact management", "Task management", "Search, and "Leave-from-company analysis" are set in a first layer. Then, when the user belonging to the group selects the group (community) after logging in to the SNS server, a selection menu screen may be displayed on the mobile terminal 3 of the user such that the user selects any item from the four items set in the first layer, that is, "Contact management", "Task management", "Search, and "Leave-from-company analysis". Thus, the user can select any item from the items set in the first layer. When the user selects, for example, "Search" or "Leave-from-company analysis" constituted only kay the first layer, the user can participate in a virtual community with the theme of "Search" or "Leave-from-company analysis", and communicate the virtual community.

Further, a second layer is set for each of "Contact management" and "Task management". For example, four items, that is, "Emergency management", "Business contact", "Task request", and "Calendar" are set as a second layer for "Contact management" of the first layer. Further, five items, that is, "Mechanical unit-related", "Control unit", "Operation-related", "Screen setting", and "Machining-related" are set as a second layer for "Task management" of the first layer. Since a third layer is not set for each item of the second layer, a virtual community with a theme of each of "Emergency management", "Business contact", "Task request", and "Calendar" is set in the contact management. When the user selects "Contact management" in the first layer, and then selects one item, for example, "Business contact", from "Emergency management", "Business contact", "Task request", and "Calendar" in the second layer, the user can participate in the virtual community with the theme of "Contact management (Business contact)", and communicate in the virtual community.

In this way, the item name can be set hierarchically. Then, the user can communicate in the virtual community by theme corresponding to the item set in the lowest layer by following the hierarchy. The SNS group management unit 111 described above sets members belonging to the virtual community by theme based on the designation of the administrator. Thus, the theme corresponding to each item and the members belonging to the virtual community of the theme are associated with each other. As described above, the members belonging to an upper-ranking hierarchy are associated with each other so as to automatically belong to a lower-ranking hierarchy. In this way, the number of options Presented to the user at one time is restricted to a relatively small number (the number that can be reasonably displayed on the mobile terminal 3, for example, about 4 and 5), and the user is sequentially selected, whereby it is possible to present a virtual community by theme that meets the restrictions of a display means and an input means of the mobile terminal 3. In this way, selection from at most 4 and 5 branch options is suitable for a branch selection type user interface that goes on the road, and even when the number of times of selection is large, since an operation can be made with a sense of game, it has the effect of not causing any pain to the user. According to the item setting illustrated in FIG. 2, as the virtual community by theme, a total of 11 virtual communities by theme have been set, that is, "Contact management (Emergency contact)", "Contact management (Business contact)", "Contact management (Task request)", "Contact management. (Calendar)", "Task management (Mechanical unit-related)", "Task management (Control unit)", "Task management (Operation-related)", "Task management (Screen setting)", "Task management (Machining-related)", "Search", and "Leave-from-company analysis". In this case, a user belonging to any of the virtual community groups by theme selects the virtual community, and thus can exchange messages on the selected virtual community by theme.

For example, in the case of the virtual community such as Contact management (Business contact), it is assumed that the community is not a community constituted with all members including an operator of the industrial machine and a maintenance group of the industrial machine, but an organization unit (for example, xx department) within a company belonging to the community, for example. Then, the virtual community by theme may be constituted by a plurality of independent virtual subcommunities for each subgroup. Specifically, as described above, the administrator may set items corresponding to the plurality of independent virtual subcommunities for each subgroup in the lower-ranking layer with respect to the items corresponding to the virtual community by theme. Thus, as described above, a user belonging to a virtual subcommunity by theme can follow the hierarchy and perform communication in a virtual sub-community of the same theme to which the user belongs, by tracing up to the virtual subcommunity of the same theme to which the user belongs, the virtual subcommunity being a lower-ranking layer of the virtual community by theme.

<Tag>

When the messages are exchanged in the virtual community by theme, it is useful to be able to use tags for classifying the contents of the messages, which are commonly used by the members belonging to the virtual community within the virtual community and exchange the messages by attaching a corresponding tag to any message. Therefore, the item setting unit 13 can set a plurality of tags for classifying the contents of the message in the item name corresponding to the virtual community, in which the messages are exchanged, based on the setting instruction of the administrator. Here, the tag is attached to the message exchanged in the virtual community by theme corresponding to the item name, and is used for classifying the contents of the message. In the following example, an example is describe in which a tag name is set in a text format, but the present invention is not limited thereto. Similarly to the item name, the tag name may be set in any format, for example, a figure, a picture, or a pictogram other than text.

Referring to FIG. 2, an example is shown in which a tag is set for each of the item names of the second layer, that is, "Mechanical unit-related", "Control unit", "Operation-related", "Screen setting", and "Machining-related" which are provided hierarchically in the "task management" of the first layer. Here, it is shown that two tags of "Question" and "Answer" are set in the item (second layer) set according to the structure of the machine tool ("Mechanical unit-related", "Control unit", "Operation-related", "Screen setting", and "Machining-related"), under the task management (first layer) related to the machine tool. Since it is assumed that the contents of the message exchanged in the virtual community by theme ("Mechanical unit-related", "Control unit", "Operation-related", "Screen setting", and "Machining-related") are "Question" and its "Answer", two tags including "Question" and its "Answer" are set herein. In FIG. 2, an example is shown in which a common tag is set for five items corresponding to the second layer, but the present invention is not limited thereto. For example, a tag may be set for each item (theme) with respect to the five items (themes) corresponding to the second layer. Further, during the setting of the tags, the number of tags is not limited to two. The tags may be set as many as needed in each community by theme. In addition, the tags may be set for each community by theme. For example, as tags other than "Question" and "Answer", tags can be arbitrarily set as "Inquiry", "Do you know?", "Please tell me", and "Please tell me a little more", for example. Further, in order to classify information about machines installed in the factory, for example, a machine identification number such as "Unit 1" or "Unit 2" may be set as a tag.

<Stamp>

Figure 6:
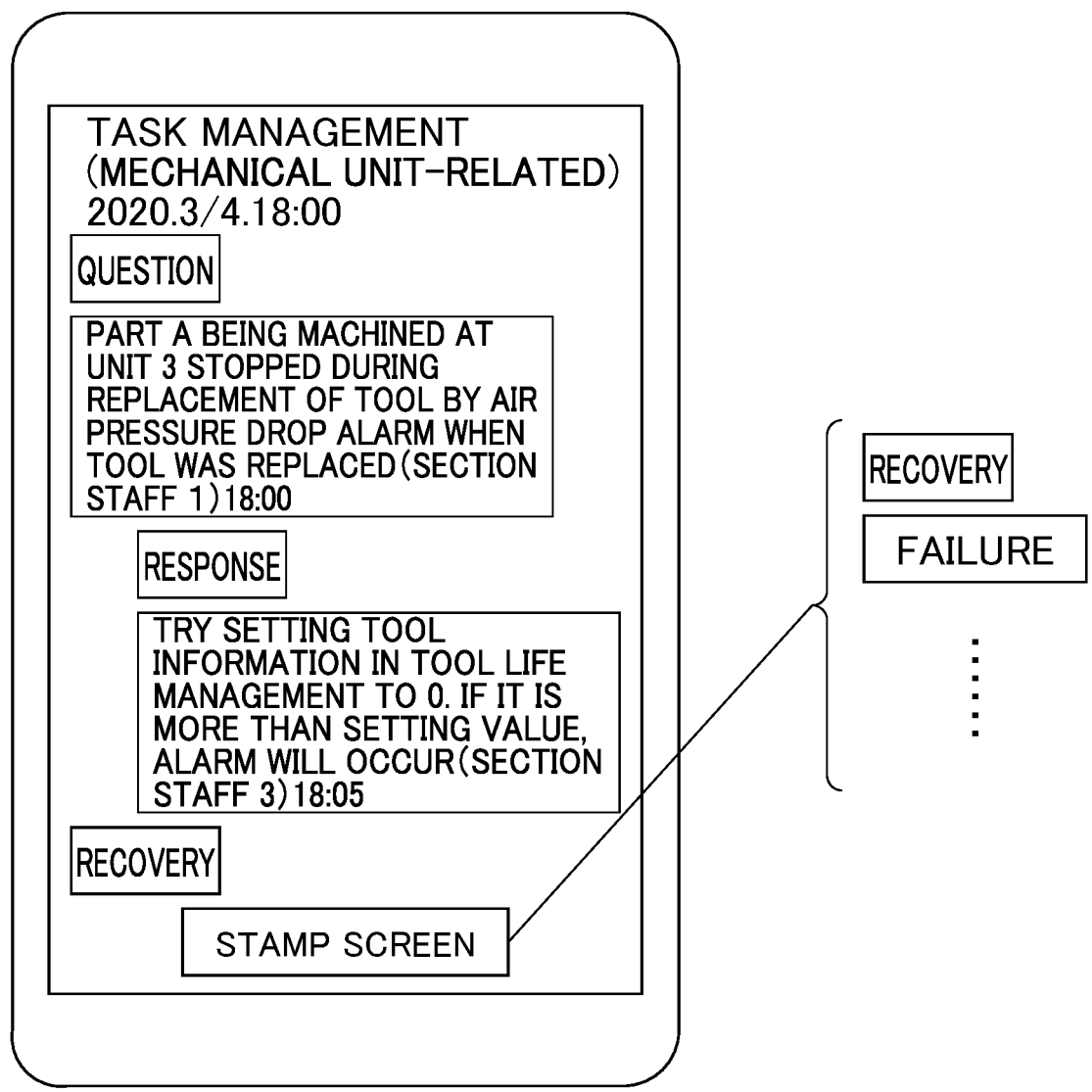
FIG. 6 is a diagram showing an example of a display on a mobile terminal of a message exchanged for each item (theme) set by the message exchanging device.

In order to evaluate a quality of the contents of the message as contents, the item setting unit 13 can set an arbitrary stamp corresponding to the item name based on the setting instruction of the administrator. Similarly to the item name and the tag name, the stamp may be set in any format, for example, a text, a figure, a picture, or a pictogram. The stamp set corresponding to the item name may be displayed on a stamp screen for selecting the stamp at a lower side of the display screen (for example, the timeline) of the message. Thus, the user can evaluate the quality of the contents of the message by selecting an appropriate stamp from the stamp screen for the message. FIG. 6 is a screen example showing a stamp set in the task management (mechanical unit-related) as an item (theme). As shown in FIG. 6, examples of stamps include "Recovery" and "Failure". In this way, for example, a questioner selects a stamp for evaluating the contents of the response to his/her question. In FIG. 6, "Recovery" and "Failure" are exemplified, but the present invention is not limited thereto. As described above, in the SNS, all messages (contents) to be exchanged can be comprehensively collected and classified by related items using, such as item names (themes), tag names, and stamps which are arbitrarily set in advance. The item name (theme), the tag, and the stamp have been described above. Next, the item setting unit 13 will be described.

As described above, the item setting unit 13 sets a common item name in advance to the group (community), based on a setting instruction from the administrator who manages the group (community), such that the message is sent based on item names, tags, and stamps common to the group (community) when any member belonging to the group (community) sends a message within the group (community) with respect to all messages exchanged within the group (community). Specifically, the item setting unit 13 can hierarchically set the item name based on the setting instruction from the administrator. Further, the item setting unit 13 can set a plurality of tags for classifying the contents of the message in the item name corresponding to the virtual community, in which the message is exchanged, based on the setting instruction from the administrator. The tags can also be set hierarchically. The item setting unit 13 can further set a plurality of stamps for evaluating the quality of the contents of the message as contents in the item name corresponding to the virtual community, in which the message is exchanged, based on the setting instruction from the administrator. The stamps can also be set hierarchically. Here, each of the item name, the tag, and the stamp may be set in any format, for example, a text, a figure, a picture, or a pictogram.

The item setting unit 13 may provide the administrator with the item setting screen via the administrator terminal in order to set the item name, the tag, and the stamp. FIGS. 3A and 3B are diagrams showing examples of an item setting screen for setting an item name for classifying messages to be exchanged, taking as an example a community including an operator of an industrial machine and a maintenance group of the industrial machine. A process of setting the item name will be described with reference to FIGS. 3A and 3E. The item setting unit 13 may set the item name as a hierarchical structure, and may provide the item setting screen so as to set the item name in the order of the hierarchy. FIG. 3A shows an example of an item setting screen interface (hereinafter, referred to as "first layer item setting screen") for setting an item name in the first layer. As shown in FIG. 3A, on the item setting screen of the first layer, an interface for setting a plurality of item names in the first layer, the number of hierarchies of each item name and a common tag for each setting item of the first layer is provided. Referring to FIG. 3A, four item names, that is, "Contact management", "Task management", "Search", and "Leave-from-company analysis" are set as the first layer. Then, each of the item names "Contact management" and "Task management" has a second layer, and the item names "Search" and "Leave-from-company analysis" are set to be constituted only by the first layer. In addition, the common tag is not required in the item names included in the first layer.

FIG. 3B shows an example of an item setting screen (hereinafter, referred to as "second layer item setting screen") for setting an item name in the second layer for "Task management" set in the first layer. As shown in FIG. 3B, on the item setting screen of the second layer, an interface for setting a plurality of item names in the second layer, the number of hierarchies of each item name and a common tag for each setting item of the second layer is provided. Referring to FIG. 3B, five item names, that is, "Mechanical unit-related", "Control unit", "Operation-related", "Screen setting", and "Machining-related" are set for the "Task management" set in the first layer. Then, all item names are set so as not to require a third layer and subsequent layers. Further, it can be seen that the common tags ("question", "response") are set for the item names included in the second layer. FIGS. 3A and 3B illustrates a template for setting two tags, but the present invention is not limited thereto. It may be a template for setting three or more tags. Further, when a plurality of tags are set that cannot be displayed on one screen, a plurality of tags may be set by scrolling with a scroll function, for example. The examples in FIGS. 3A and 3B include setting examples of item names having a hierarchical structure up to the second layer, the present invention is not limited thereto. The number of hierarchies may be any number. Although the example of stamp setting is not shown, the template may be provided with a stamp setting screen for setting a stamp in a bottom zone of the item setting screen, for example.

<Item-Specific Message Creation Unit 14>

As described above, the SNS message exchanging unit 112 can add a tag set for each set setting item to the message within the specific group (community) in which the item names or the like are set in advance, or can handle the stamp set for each set setting item as a message. Specifically, the SNS message exchanging unit 112 treats the users belonging to the virtual community by theme set by the item setting unit 13 to add a tag to the message or exchange a stamp as a message, based on a tag for classifying messages and a stamp for evaluating a message to be evaluated. For this reason, the control unit 10 may include a function unit (referred to as "item-specific message creation unit 14") that assigns the item name, the tag list, and the stamp list set corresponding to the specific group (community) by the item setting unit 13 to the common user interface screen set in advance. The SNS message exchanging unit 112 may cooperate with the item-specific message creation unit 14. Thus, the user can exchange messages (contents) via the user interface screen to which the item name, the tag, and the stamp are assigned. When a plurality of tags and a plurality of stamps are assigned that cannot be displayed on one screen, a plurality of tags and a plurality of stamps can be selected by scrolling with a scroll function, for example. Specifically, for example, when the user transmits a message, the item-specific message creation unit 14 may add the tag selected by the user to the message from the tag list assigned to the user interface screen. Similarly, when the user transmits a stamp, the item-specific message creation unit 14 may use, as a message, the stamp selected by the user from the stamp list assigned to the user interface screen. As shown in FIG. 1, the item-specific message creation unit 14 may be a function unit independent of the SNS message exchanging unit 112. Further, the SNS message exchanging unit 112 may include the item-specific message creation unit 14.

Each of FIGS. 4, 5, 6, and 7 is a diagram showing an example of a common user interface created by the item-specific message creation unit 14 in "Contact management (Business contact)", "Leave-from-company analysis" "Task management (Mechanical unit-related)", and "Search" which are exemplified as theme-specific virtual security set by the item setting described above. Here, the processing of the item-specific message creation unit 14 will be described with reference to each of FIGS. 5, 6, and 7. As described above, the item-specific message creation unit 14 creates a common user interface for inputting/outputting to/from the mobile terminal 3 of the user belonging to the virtual community.

Figure 4:
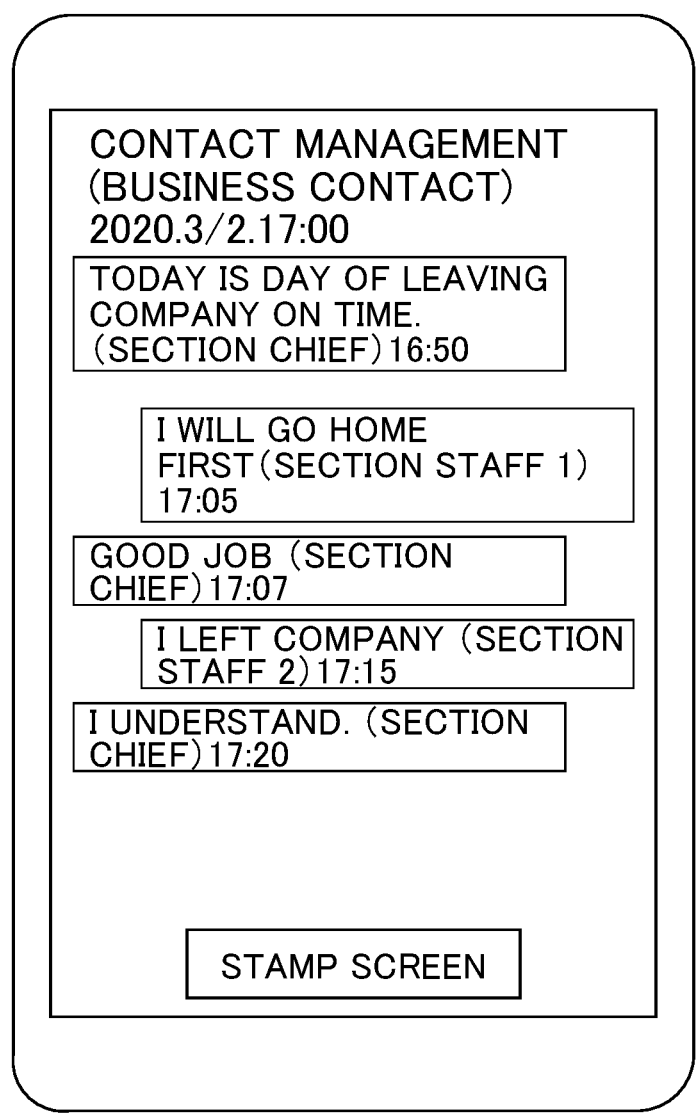
FIG. 4 is a diagram showing an example of a display on a mobile terminal of a message exchanged for each item (theme) set by the message exchanging device.

First, cooperation processing between the SNS message exchanging unit 112 and the item-specific message creation unit 14 in "Contact management (Business contact)" will be described with reference to FIG. 4. In this case, as shown in FIG. 2, the SNS message exchanging unit 112 first outputs the screen of the first layer to the mobile terminal 3 of the user who belongs to the community or any low-ranking group (community), and thus causes the user to select an item. For example, when "Contact management" is selected on the screen of the first layer, the SNS message exchanging unit 112 outputs the screen of the second layer to the mobile terminal 3 of the user based on the selection input. Here, when "Business contact" is selected, the SNS message changing unit 112 cooperates with the item-specific message creation unit 14, and as shown in FIG. 4, outputs the common user interface for exchanging messages in "Contact management (Business contact)" created by the item-specific message creation unit 14 to the mobile terminal 3 of the user. In this example, a section chief informs a section staff of a company leaving date on time with a message, and thus message exchange with the section staff who is a member belonging to the community starts. Referring to FIG. 4, a section staff 1 replies "I will go home first", the SNS message exchanging unit 112 cooperates with the item-specific message creation unit 14 to display a message of the section staff 1 who is a responder and a response time. Subsequently, a section staff 2 replies "I left the company". In this way, the section chief and the section staff belonging to the community can check the leave-from-company status while communicating with each other on the SNS.

Figure 5:
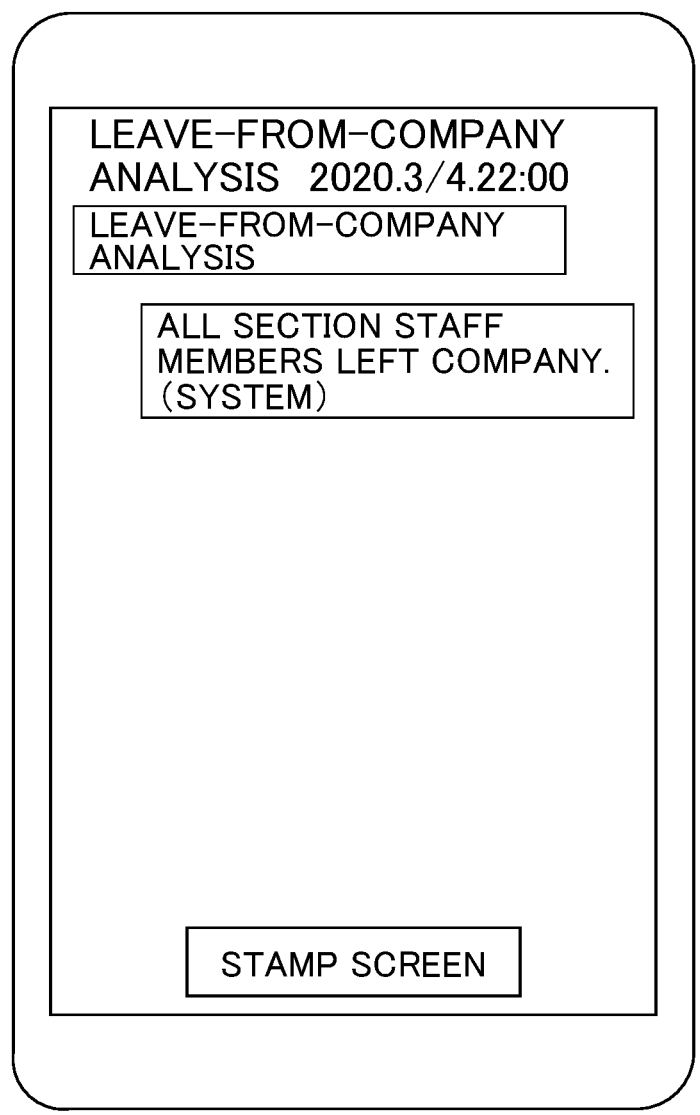
FIG. 5 is a diagram showing an example of a display on a mobile terminal of a message exchanged for each item (theme) set by the message exchanging device.

FIG. 5 illustrates a case in which the SNS message exchanging unit 112 outputs a user interface for analyzing the leave-from-company status to the mobile terminal 3 of the user (for example, the section chief), based on the message from the section staff collected using the messages in which the section chief informs the section staff of the company leaving date on time in the "Contact management (Business contact)" described above. In this case, as shown in FIG. 2, the SNS message exchanging unit 112 outputs the screen of the first layer to the mobile terminal 3 of the user (for example, the section chief) belonging to the community. Here, when the user (for example, the section chief) selects "Leave-from-company analysis" that is an item in the first layer, the SNS message exchanging unit 112 cooperates with the item-specific message creation unit 14, and, as shown in FIG. 5, outputs the common user interface for exchanging messages in "Leave-from-company analysis" to the mobile terminal 3 of the user (for example, the section chief). Thus, for example, the message exchange (communication) is performed between the section chief who is a user belonging to the community and "Leave-from-company analysis service software" created in advance, and thus the message (content) regarding the leave-from-company status can be easily confirmed. Specifically, the leave-from-company status may be confirmed by, for example, "Leave-from-company analysis service software" created in advance. In that case, the "Leave-from-company analysis service software" is executed on the SNS server 1 to search the business contact messages comprehensively collected in "Contact management (Business contact)" of this day, and the determination is made based on information on leaving the company, the number of section staff members who have input the information, and the number of section staff members. An AI engine, which will be described below, may be used to determine leaving the company.

Next, message exchange in the virtual community in "Task management" will be described. FIG. 6 is a diagram showing a user interface output by the item-specific message creation unit 14 in "Task management (Mechanical unit-related)". As in the case of "Contact management (Business contact)", when the user selects "Task management" on the screen of the first layer and "Mechanical unit-related" on the screen of the second layer, the SNS message exchanging unit 112 cooperates with the item-specific message creation unit 14, and, as shown in FIG. 6, outputs the common user interface for exchanging messages "Task management (Mechanical unit-related)" on the screen of the second layer created by the item-specific message creation unit 14 to the mobile terminal 3 of the user. The SNS message exchanging unit 112 exchanges a message "Part A being machined at Unit 3 stopped during replacement of the tool by an air pressure drop alarm when the tool was replaced" (hereinafter, referred to as "task A") added with the tag (question) selected by the section staff 1, and thus the section staff 1 belonging to the community and another section staff start communication regarding a task A in the virtual community. As shown in FIG. 6, when a message "Try setting tool information in a tool life management to 0. If it is more than the setting value, an alarm will occur" from a section staff 3 is output in a state of being added with a tag (response), the section staff 1 can evaluate the response message, for example. Here, the section staff 1 expresses an evaluation of "Recovery" by the message of the section staff 3 by a stamp ("Recovery") selected from a stamp screen, Although not shown, a "Unit 3" tag may be added together with a "Question" tag to identify a machine. In this way, when message exchange (communication) is performed between the section staffs who are users belonging to the community, messages (contents) related to alarms of mechanical unit-related (alarms during replacement of the tool) are comprehensively collected and classified, and this makes it easy to consider how to respond to the alarm. In addition, although the virtual community among the section staffs is exemplified, message exchange may be performed in the virtual community, including the maintenance group including the call center of the manufacturer and the machining group including the machining member of the machine-tool builder, for example. In FIG. 6, a case is illustrated where the machine is recovered by implementing the advice of the section staff 3, but when the machine is not recovered by implementing the advice of the section staff 3, it is possible to transmit the fact by selection of a stamp "Failure", for example. In this way, the use of stamps or the like can be expected to have the effect of increasing familiarity among users and activating communication.

Figure 7:
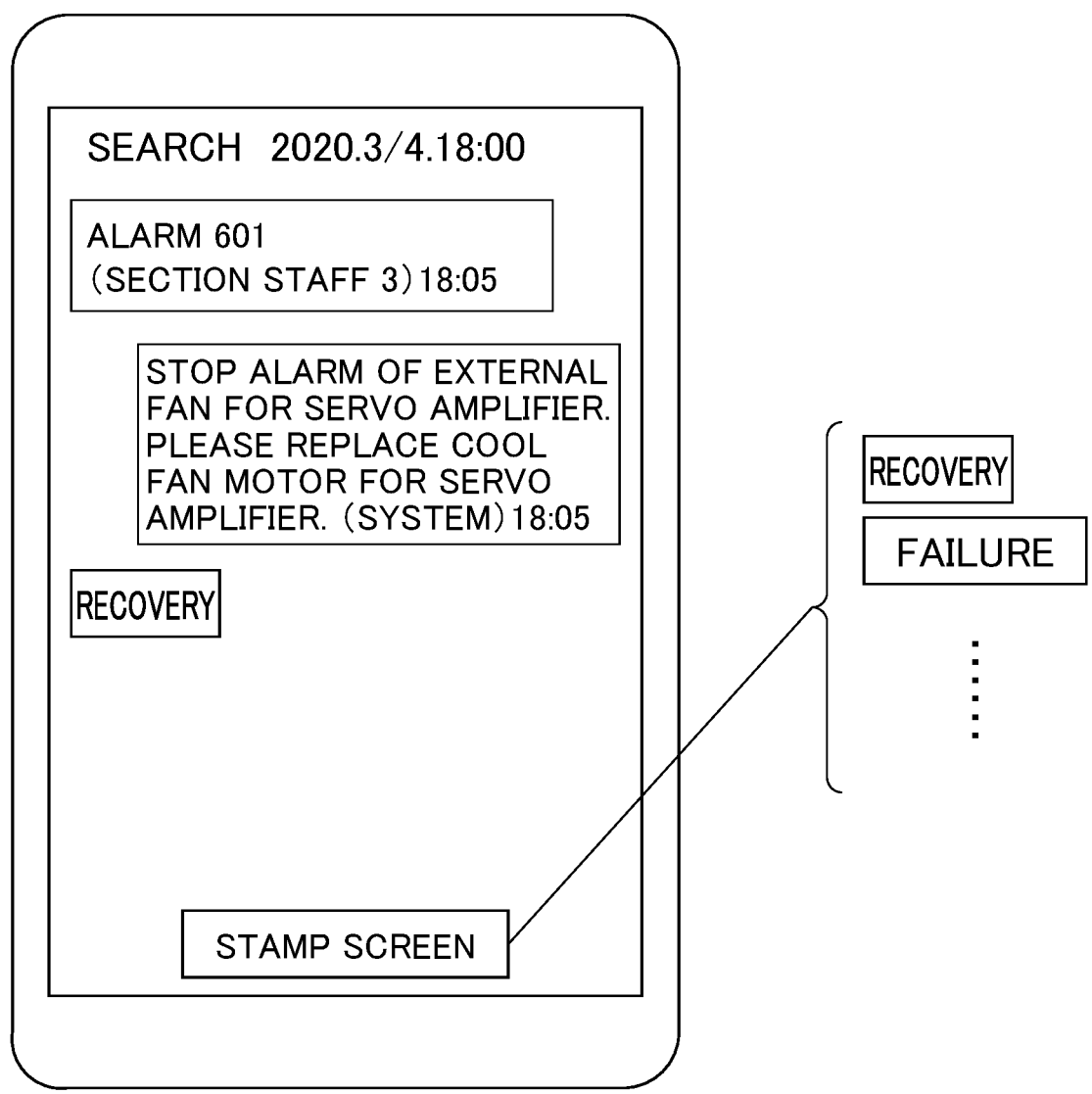
FIG. 7 is a diagram showing an example of a display on a mobile terminal of a message exchanged for each item (theme) set by the message exchanging device.

FIG. 7 shows a display example in which an appropriate coping method is searched for based on a set of messages (contents) stored in the storage unit 20 in a state where the messages related to alarms are comprehensively collected and classified. As in the case of "Contact management (Business contact)", when the user selects "Search" on the screen of the first layer, the SNS message exchanging unit 112 cooperates with the item-specific message creation unit 14, and, as shown in FIG. 7, outputs the common user interface for exchanging messages in "Search" on the screen of the first layer to the mobile terminal 3 of the user. As shown in FIG. 7, the section staff 3 inquiries to the search system that "Alarm 601 has occurred" via the common user interface for performing message exchange in "Search", and thus a corresponding message for alarm 610 can be obtained from the search system. In this case, the section staff 3 expresses the evaluation of "Recovery" for the corresponding message from the search system by the stamp ("Recovery") selected from the stamp screen. The processing contents when the common user interface is created by the item-specific message creation unit 14 have been described above with reference to the example. As described above, the SNS message exchanging unit 112 cooperates with the item-specific message creation unit 14, and thus it is possible to obtain the effect that all messages can be comprehensively collected based on the preset item names, tags, and stamps in the message exchange between the members of any group in the SNS.

<Item-Specific Message Management Unit 15>

As described above, the SNS message management unit 113 may store the message exchanged within the preset specific group (community) by associating the tag set in advance in the item-specific message storage unit 25 provided for each specific group (community) with the message. Further, the SNS message management unit 113 may store the stamp exchanged within the preset specific group (community) in association with the target message of the stamp. For this reason, during message exchange within a specific group (community), the control unit 10 includes a function unit ("item-specific message management unit 15") that executes a function of storing and managing the tag set for each setting item in the item-specific message storage unit 25 in association with the message and a function of storing and managing the stamp set for each setting item in the item-specific message storage unit 25 in association with a target message of the stamp. The SNS message management unit 113 may realize the above functions by cooperating with the item-specific message management unit 15. As shown in FIG. 1, the item-specific message management unit 15 may be a function unit independent of the SNS message exchanging unit 112. Further, the SNS message exchanging unit 112 may include the item-specific message management unit 15.

The case of "Task management (Mechanical unit-related)" described above will be described as an example with reference to FIG. 6. The item-specific message management unit 15 stores a message with a question tag (referred to as "question message"), a message with an response tag (referred to as "response message"), and an evaluation message for the response message listed in "Task management (Mechanical unit-related)", in the storage zone provided corresponding to "Task management Mechanical unit-related)", by comprehensively collecting and classifying these messages. For this reason, at a later date, by searching based on the messages that are comprehensively collected and classified, the knowledge about each task can be generated by machine learning an appropriate response or an illegal response to each task. In addition, Q&A can be created by analysis of these data.

Similarly, for example, response messages with respect to respective alarms included in the question message listed in "Task management (Mechanical unit-related)", "Task management (Control unit)", "Task management (Operation-related)", "Task management (Screen setting)", and "Task management. (Machining-related)" and evaluation messages for the response messages are stored in the storage zone provided corresponding to each theme, in a state of being comprehensively collected and classified. For this reason, as described with reference to FIG. 7, the user can search for an appropriate response or an illegal response to an arbitrary alarm based on these content sets in "Search". The constitution of the SNS server 1 has been described above.

<Mobile Terminal 3>

The mobile terminal 3 is a terminal owned and used by each user. The mobile terminal 3 communicates with the SNS server 1, and communicates with other users of the mobile terminal 3 according to the contents of communication processing. The mobile terminal 3 is, for example, an information terminal represented by a smartphone. The mobile terminal 3 includes a control unit 30, a storage unit 40, a touch panel display 46, and a communication interface unit 49.

The control unit 30 is a CPU that controls the entire mobile terminal 3. The control unit 30 appropriately reads and executes an OS and an application program (hereinafter, the application program of the mobile terminal 3 being also simply referred to as "application") stored in the storage unit 40 and executes various functions by collaborating with the above-described hardware. The control unit 30 includes a log-in processing unit 31, a display control unit 32, and a transmission/reception unit 33. These functions are known to those skilled in the art and will not be described.

The storage unit 40 is a storage zone of a semiconductor memory element, or the like for storing programs, data, and the like necessary for the control unit 30 to execute various processes. The storage unit 40 includes a program storage unit 41.

The touch panel display 46 has a function as a display unit constituted by a liquid crystal panel or the like and a function as an input unit for detecting a touch input by a finger from a user or the like. The communication interface unit 49 is an interface for communicating with the SNS server 1 via the communication network N.

<Administrator Terminal 5>

The administrator terminal 5 is a terminal used by an administrator who hosts a specific group (community) in the SNS system 100 by using the item setting unit 13 described above. Here, the administrator may be set for each specific group (community) to be hosted. The administrator terminal 5 is, for example, a mobile terminal or a PC (personal computer). The administrator terminal 5 includes a control unit, a storage unit, a communication interface unit, a display unit, and an input unit (all the components not being shown), for example. The constitution of each of the function units of the SNS server 1 according to the first embodiment has been described above.

Next, an operation of the SNS server 1 will be described with reference to a flowchart shown in FIG. 8. FIG. 8 is a flowchart showing a process in which the SNS server 1 sets item names, tags, and stamps commonly used by members belonging to a group that uses contents, based on an instruction of the administrator who is a host of the group.

The flowchart shown in FIG. 8 shows a process of setting item names corresponding to one or more layers set in an i-th layer ($i \geq 1$), setting a tag common to the respective layers set in the i-th layer, and setting a common stamp. The SNS server 1 has already authenticated that the user logged in from the administrator terminal 5 is an administrator having common item setting authority. It should be noted that these layers have a hierarchical structure with i=0 as a root. When a lower-ranking layer is set for each (i−1)-th layer, one or more i-th layers are set.

Referring to FIG. 8, the process of setting the item name in the i-th layer (i≥1) is as follows. In Step S10, the SNS server 1 (item setting unit 13) receives a setting request for one or more i-th layers that are lower-ranking layers with respect to the (i−1)-th layer from the administrator terminal 5.

In Step S11, the SNS server 1 (item setting unit 13) may provide to the administrator terminal 5 with the item name setting screen (template screen) shown in FIGS. 3A and 3B, for example, in order to set item names of respective layers, the number of hierarchies located below the item names, and a common tag name and stamp name for these layers in response to the setting request for one or more i-th layers that are lower-ranking layers with respect to the (i−1)-th layer from the administrator terminal 5. The user may add an input field for setting the item names and the number of hierarchies located below the item names, an input field for setting the tag name, and an input field for setting the stamp name with an instruction. When a plurality of input fields do not fit in one screen, scroll processing may be performed, for example.

In Step S12, the SNS server 1 (item setting unit 13) acquires the item names input via the administrator terminal 5, the number of hierarchies located below the item names, the tag name, and the stamp name.

In Step S13, the SNS server 1 (item setting unit 13) specifies an item name, in which the number of hierarchies located below the item names is set to a value of 2 or more, from the acquired one or more item names.

In Step S14, for each item name in which the number of hierarchies is set to the value of 2 or more, the process proceeds to the item name setting process in a (i+1)-th layer (i≥1).

In this way, the item name setting process is performed sequentially in the order of a first layer setting process, a second layer setting process for each item name in which the number of hierarchies is set to the value of 2 or more in the first layer, a third layer setting process for each item name in which the number of hierarchies is set to the value of 2 or more in the second layer, . . . , and the item name setting process is executed until the setting process in all hierarchies is completed. Thus, the SNS server 1 (item setting unit 13) can set the item names hierarchically. The first embodiment has been described above. Next, a second embodiment will be described.

Second Embodiment

In the SNS server 1 according to the first embodiment described above, the CPU as the control unit 10 executes various programs stored in the program storage unit 21, and thus the SNS basic function unit 11 (the SNS group management unit 111, the SNS message exchanging unit 112, and the SNS message management unit 113), the item setting unit 13, the item-specific message creation unit 14, and the item-specific message management unit 15 are implemented. On the other hand, in the second embodiment, a distributed processing system is exemplified as shown in FIG. 9 in which a server 1 is arranged on a cloud 1 and a server 2 is arranged on a cloud 2, for example. FIG. 9 is a diagram showing a constitution in which the server 1, the server 2, and one or more mobile terminals 3 are network-connected via a communication network N. Here, the server 1 may be a server managed by an operator who operates the SNS, and the server 2 may be a server operated by an administrator who hosts message exchange based on a setting item arbitrarily set using the SNS. Specifically, for example, an SNS server 1A is constituted as a distributed processing system in which the control unit executes an SNS basic program on the server 1 to implement the SNS basic function unit 11 (the SNS group management unit 111, the SNS message exchanging unit 112, and the SNS message management unit 113), and in which the control unit executes an item setting program on the server 2 to implement the item setting unit 13, the item-specific message creation unit 14, and the item-specific message management unit 15. The server 1 may execute a basic message exchange function, a search function, or the like in the SNS service. Further, the server 2 includes, for example, a metadata storage unit 24 and an item-specific message storage unit 25, and may store an item data dictionary set by the item setting unit 13 and an item-specific message managed by the item-specific message management unit 15 and exchanged based on the item name set by the item setting unit 13. The server 2 may be a server managed by an administrator who hosts the community including the user who performs a machining process on a workpiece using the industrial machine running in the factory, the member of the industrial machine-tool builder who supports the machining process of the user, the maintenance personnel of the industrial machine, and the receptionist of the call center as exemplified in the first embodiment. In the second embodiment, the above-described community is described as an example, but the community is not limited thereto. For example, the server 2 may be a server managed for each community, which is arbitrarily set, by an administrator who hosts the community. Thus, all the messages exchanged in the community can be accumulated in the server 2 managed by the host, and information security of the message can be ensured. In addition, the accumulated messages can be comprehensively searched by tags or the like set by the item setting unit 13. Hereinafter, the constitution in the second embodiment different from that in the first embodiment will be described, but the same constitution as that in the first embodiment will not be described.

FIG. 9 is a diagram showing a constitution in which the server 1, the server 2, and one or more mobile terminals 3 are network-connected via the communication network N. Further, the server 2 may acquire running data output by the industrial machine, a peripheral device, a sensor device, or the like (also referred to as "edge device") installed in the factory directly from the edge device or via a factory management device (also referred to as "edge server"), and may store it as factory running database. Thus, for example, when it is desired to insert current running information and operation information of an edge device (for example, Unit 1) installed in the factory during message exchange between the users, running status information (for example, status information during running, alarming, and stopping) and operation information (for example, alarm number, program number) of Unit 1 can be inserted by tag information such as "status of Unit 1" set in advance by the item setting unit 13. In addition, a time when messages are exchanged by the SNS can be linked to a phenomenon that has occurred in the factory. Thus, it can be used for running analysis of the edge device in the factory or the like. Further, for example, characteristics of the question message collected in "Task management. (Mechanical unit-related)" shown in FIG. 6 are extracted using an AI function or the like, and a response message for the question message with the same characteristics is created, whereby the response message can be automatically provided to the question message, for example.

Further, the storage unit provided in the server 2 may store document data such as manual data including various specification data related to the edge device. Thus, for example, when it is desired to cite the contents described in the manual during the message exchange between the users, the contents can be cited. Further, the storage unit provided in the server 2 may store a model of the common user interface for exchanging messages created by the item-specific message creation unit 14 as shown in FIG. 6.

In addition, when the function of the item set in the server 2 is a unique service such as "Leave-from-company analysis", an application program may be arranged in the server 2 to achieve the unique service. The application program that provides such a service may be downloaded from, for example, an application sales store. The SNS server 1A according to the second embodiment exemplified as the present embodiment has been described above.

In other words, the message exchanging device and the message exchanging method of the present disclosure can take various embodiments as follows.

(1) According to the present embodiment, the message exchanging device is a message exchanging device (for example, "SNA server 1, 1A") that exchanges messages between members belonging to any group, using an SNS group function, the message exchanging device including: a storage unit (for example, "storage unit 20") that stores the messages exchanged between the members; an item setting unit (for example, "item setting unit 13") that sets items for classifying the messages exchanged between the members belonging to the group; a message exchanging unit (for example, "SNS message exchanging unit 12") that exchanges a message for each of the items set by the item setting unit; and an item-specific message management unit (for example, "item-specific message management unit 15") that stores, for each of the items, the message exchanged for each of the items in the storage unit. Thus, when the messages (contents) are exchanged in any community that uses the SNS, the classification items can be arbitrarily set in advance to be commonly used for the messages (contents) sent by all the users belonging to the community.

(2) The message exchanging device (for example, "SNA server 1, 1A") described in (1) above may include an item-specific message creation unit (for example, "item-specific message creation unit 14") that adds a tag, which is used for further classifying the message, to the message exchanged for each of the items, the item setting unit (for example, "item setting unit 13") may further set the tag, which is used for further classifying the message exchanged for each of the items, and the item-specific message management unit (for example, "item-specific message management unit 15") may further store the tag in the storage unit by associating the tag with the message exchanged for each of the items. Thus, when the messages (contents) are exchanged in any community that uses the SNS, a plurality of tags for classifying the contents of the messages can be arbitrarily set and can be attached to the messages to be exchanged.

(3) In the message exchanging device (for example, "SNA server 1, 1A") described in (2), the item setting unit (for example, "item setting unit 13") may further set a stamp used to evaluate the message, the item-specific message creation unit (for example, "item-specific message creation unit 14") may further create the stamp in association with the message to be evaluated and exchanged for each of the items, and the item-specific message management unit (for example, "item-specific message management unit 15") may further store the stamp in the storage unit (for example, "storage unit 20") in association with the message to be evaluated and exchanged for each of the items. Thus, when the messages (contents) are exchanged in any community that uses the SNS, a plurality of stamps for evaluating the quality of the contents of the message can be arbitrarily set and can impart evaluation to the message.

(4) in the message exchanging device (for example, "SPA server 1, 1A") described in any one of (1) to (3) above, the item setting unit (for example, "item setting unit 13") may further set the plurality of items to have a hierarchical structure. Thus, the number of items presented to the user at one time is limited to the number that can be reasonably displayed on the mobile terminal 3, for example, and the user sequentially selects the items, whereby it is possible to present the virtual community by item that meets the restrictions of the display means or the input means of the mobile terminal 3.

(5) According to the present embodiment, the message exchanging method executed by the computer is a message exchanging method of exchanging messages between members belonging to any group, using an SNS group function, the computer including a storage unit that stores the messages exchanged between the members, the method including: an item setting step of setting items for classifying the messages exchanged between the members belonging to the group; a message exchange step of exchanging a message for each of the items set in the item setting step; and an item-specific message management step of storing, for each of the items, the message exchanged for each of the items in the storage unit. Thus, the same effect as in (1) above can be obtained.

(6) The message exchanging method described in (5) above may further include an item-specific message creation step of adding a tag, which is used for further classifying the message, to the message exchanged for each of the items, the item setting step may further include a step of setting the tag, which is used for further classifying the message exchanged for each of the items, and the item-specific message management step may further include a step of storing the tag in the storage unit by associating the tag with the message. Thus, the same effect as in. (2) above can be obtained.

(7) in the message exchanging method described in (6) above, the item setting step may further include a step of setting a stamp used to evaluate the message, the item-specific message creation step may further include a step of creating the stamp in association with the message to be evaluated and exchanged for each of the items, and the item-specific message management step may further include a step of storing the stamp in the storage unit in association with the message to be evaluated and exchanged for each of the items. Thus, the same effect as in (3) above can be obtained.

(8) According to the present embodiment, in the message exchanging method described in any one of (5) to (7) above, the item setting step may further include a step of setting the plurality of items to have a hierarchical structure. Thus, the same effect as in (4) can be obtained.

Although embodiments of the present invention have been described above, the present invention is not limited to the above-described embodiments. Further, the effects described in the present embodiments are merely a list of the

EXPLANATION OF REFERENCE NUMERALS 1, 1A SNS server
3 mobile terminal
5 administrator terminal
10 control unit
11 SNS basic function unit
111 SNS group management unit
112 SNS message exchanging unit
113 SNS message management unit
13 item setting unit
14 item-specific message creation unit
15 item-specific message management unit
20 storage unit
21 program storage unit
22 user storage unit
23 group storage unit
24 metadata storage unit
25 item-specific message storage unit
29 communication interface unit
30 control unit
40 storage unit
46 touch panel display
49 communication interface unit
100 SNS system most preferable effects resulting from the present invention, and the effects according to the present invention are not limited to those described in the present embodiments.

The invention claimed is:

1. A message exchanging device that exchanges messages between members belonging to any group, using an SNS group function, the message exchanging device comprising:
a memory:
one or more processors coupled to the memory for executing:
storing the messages exchanged between the members;
setting items for classifying the messages exchanged between all of the members belonging to the group, wherein the items are set in advance and the items are commonly used for messages sent by all of the members of the group, wherein the setting further sets a tag, which is used for classifying the message exchanged for each of the items, and sets a stamp used to evaluate the message;
exchanging all of the messages between members according to the items set; and
storing, for each of the items, all of the messages exchanged for each of the items for classifying the messages,
wherein the messages include, for each of the items, question messages, one or more response messages to each of the question messages, and one or more evaluation messages with regard to a quality of contents of each of the response messages, whereby knowledge about an appropriate response or an inappropriate response can be generated, for each of the items, based on the evaluation messages comprehensively collected for the response messages.

2. The message exchanging device according to claim 1, wherein the one or more processors further execute: adding a tag, which is used for further classifying the message, to the message exchanged for each of the items, further storing the tag by associating the tag with the message exchanged for each of the items.

3. The message exchanging device according to claim 2, wherein the one or more processors further execute: creating the stamp in association with the message to be evaluated and exchanged for each of the items, and further storing the stamp in association with the message to be evaluated and exchanged for each of the items.

4. The message exchanging device according to claim 1, wherein the item setting unit further
sets the plurality of items to have a hierarchical structure.

5. A message exchanging method of exchanging messages between members belonging to any group, using an SNS group function, the message exchanging method being executed by a computer including a storage unit that stores the messages exchanged between all of the members and comprising:
an item setting step of setting items for classifying the messages exchanged between all of the members belonging to the group, wherein the items are set in advance and the items are commonly used for messages sent by all of the members of the group, wherein the item setting step further includes a step of setting the tag, which is used for further classifying the message exchanged for each of the items, and a step of setting a stamp used to evaluate the message;
a message exchange step of exchanging all of the messages between members according to the items set in the item setting step; and
an item-specific message management step of storing, for each of the items, all of the messages exchanged for each of the items for classifying the messages in the storage unit,
wherein the messages include, for each of the items, question messages, one or more response messages to each of the question messages, and one or more evaluation messages with regard to a quality of contents of each of the response messages, whereby knowledge about an appropriate response or an inappropriate response can be generated, for each of the items, based on the evaluation messages comprehensively collected for the response messages.

6. The message exchanging method according to claim 5, comprising an item-specific message creation step of adding a tag, which is used for further classifying the message, to the message exchanged for each of the items and the item-specific message management step further includes a step of storing the tag in the storage unit by associating the tag with the message.

7. The message exchanging method according to claim 6, wherein the item-specific message creation step further includes a step of creating the stamp in association with the message to be evaluated and exchanged for each of the items, and the item-specific message management step further includes a step of storing the stamp in the storage unit in association with the message to be evaluated and exchanged for each of the items.

8. The message exchanging method according to claim 5, wherein the item setting step further includes
a step of setting the plurality of items to have a hierarchical structure.

* * * * *